J. KERNS.
CARBURETER.
APPLICATION FILED JAN. 9, 1911.
1,041,099.
Patented Oct. 15, 1912.
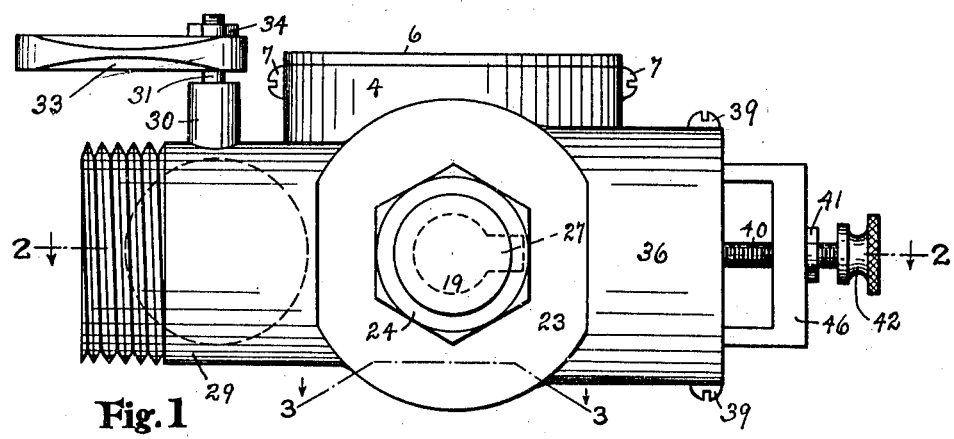
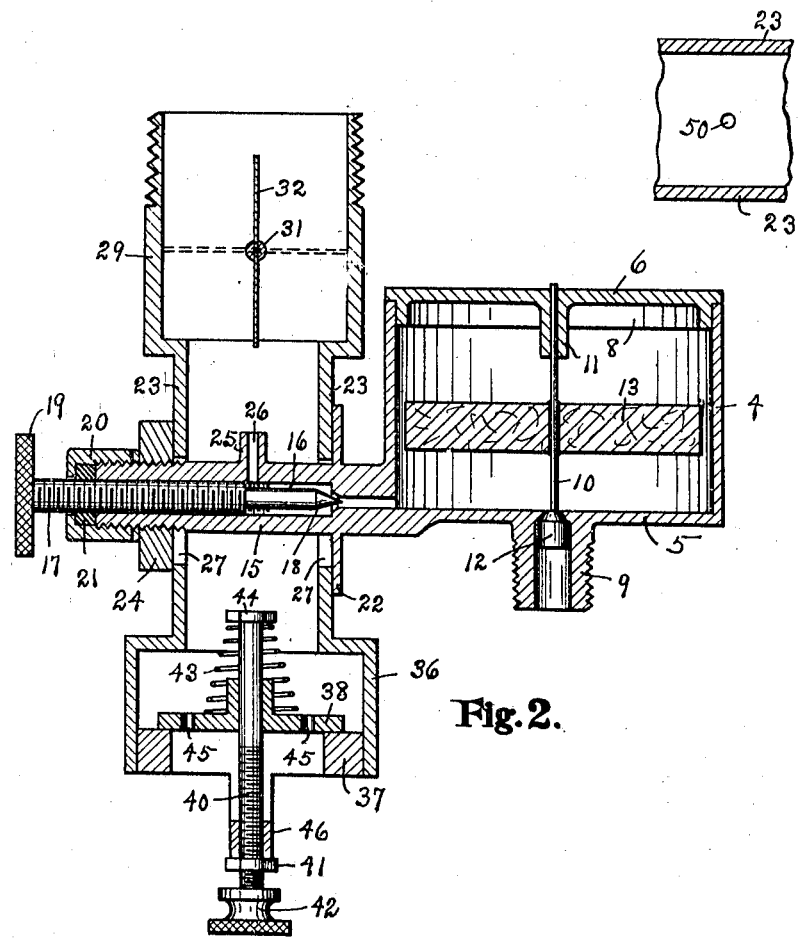
Witnesses
Albert A. Hofmann
E. M. Brown
Inventor
James Kerns.
By Edward N. Pagelsen
Attorney

UNITED STATES PATENT OFFICE.

JAMES KERNS, OF WAYNE, MICHIGAN, ASSIGNOR, BY DIRECT AND MESNE ASSIGNMENTS, OF THREE-FOURTHS TO JOHN HOWSE AND ONE-FOURTH TO NETTIE TALMON, OF WAYNE, MICHIGAN.

CARBURETER.

1,041,099.   Specification of Letters Patent.   Patented Oct. 15, 1912.

Application filed January 9, 1911. Serial No. 601,626.

*To all whom it may concern:*

Be it known that I, JAMES KERNS, a citizen of the United States, and a resident of Wayne and county of Wayne and State of Michigan, have invented a new and Improved Carbureter, of which the following is a specification.

This invention relates to means for vaporizing liquid fuel such as gasolene and alcohol, for explosion engines, and its object is to provide a carbureter having a float chamber and a carbureting chamber which shall be so constructed that the float chamber may remain upright at whichever angle the carbureting chamber may be placed.

This invention consists in a novel carbureting chamber having an air valve and a throttle, in combination with a float chamber, and a tube extending from the float chamber through the carbureting chamber and revolubly adjustable therein, and a valve for controlling the flow of the liquid fuel into the carbureting chamber.

In the accompanying drawing, Figure 1 is a plan of the carbureter. Fig. 2 is a section on the line 2—2 of Fig. 1 when the float chamber is turned parallel to the carbureting chamber. Fig. 3 is a section on the line 3—3 of Fig. 1.

Similar reference characters refer to like parts throughout the several views.

The float chamber for this device may be of any desired type. That shown consists of a shell 4 having a bottom 5 and a top 6, secured to the shell by means of the screws 7 which extend through the shell and into the flange 8. The hub 9 on the bottom is threaded to connect to the fuel pipe. A valve stem 10 passes through a perforation in the sleeve 11 extending down from the cover, and has a valve 12 on its lower end and a float 13 secured intermediate its ends. The operation of this float chamber is so apparent that it need not be explained.

Projecting from the float chamber is a tube 15 which has a bore 16 through which the fluid flows from the float chamber, and into which the stem 17 of the needle valve 18 is screwed. This stem may have a knurled button 19 or any other operating device on its end. A gland 20 screws onto the outer end of the tube 15 and compresses a ring of packing 21 in order to prevent any possible leakage around the stem 17. A collar 22 engages one side 23 of the carbureting chamber, while a nut 24 which is screwed onto this tube, engages the other side, the chamber being flattened at this point and bulges out laterally as shown in Fig. 1. Projecting upwardly from the tube is a nipple 25 having a bore 26, through which the liquid fuel will flow into the carbureting chamber. The sides 23 of the chamber have slots 27 which extend in any direction from the bores through which the tube 15 extends, so that this nipple 25 can pass through either of the walls 23. It will be seen that therefore the float chamber can be mounted on either side of the carbureting chamber and that the tube 15 may be turned so that the float chamber may always stand in a vertical position, irrespective of the angular position of the carbureting chamber.

One end of the carbureting chamber may be in the form of a threaded sleeve 29 and may be provided with a projection 30 which is bored to receive the stem 31 of the throttle valve 32. An operating handle 33 is adjustably secured to this stem 31 by means of a nut 34.

At the opposite end of the carbureting chamber is another cylindrical portion 36 in which is removably secured the annular valve seat 37 of the air valve 38. Screws 39 passing through the cylinder 36 into the seat 37, may be employed to hold it in position. A yoke 46 extends outwardly and is threaded to receive the stem 40 which may be locked in position by means of the nut 41. A button 42 on the outer end of the stem 40 is adapted to control the operative length of this stem. A spring 43, between the valve 38 and the head 44 on the stem, normally holds the valve on its seat. If desired, the valve may be formed with perforations 45.

A small hole 50 may be drilled in the shell of the carbureting chamber at the lowest point in order that any overflow of the fuel may drain off. The threaded sleeve 29 will connect to the intake port of the explosion engine, and at each intake stroke, air will be drawn through the other end of the carbureting chamber, lifting the valve 38 from its seat and passing over the discharge opening 26. As a partial vacuum will be formed in the carbureting chamber, owing to the resistance of the valve 38, liquid fuel will be drawn out from the float chamber through the passage 16 and opening 26 and will be absorbed by the air passing through the carbureting chamber. The passage of the air will be controlled by the throttle valve 32 in the usual manner.

Having now explained my improvements, what I claim as my invention and desire to secured by Letters Patent is:

In a carbureter, the combination of a carbureting chamber comprising a hollow body having flat sides and cylindrical ends, a revolubly adjustable tube extending through said sides and having a collar bearing against one side, a nut on said tube engaging the opposite side, a float-valve chamber connected to one end of said tube, a needle valve mounted in said tube for controlling the flow of fuel therethrough, a nozzle projecting upward from said tube at the central line of the carbureting chamber and a gland on the end of said tube to prevent leakage around the needle valve stem.

In testimony whereof I have signed this specification in the presence of two subscribing witnesses.

JAMES KERNS.

Witnesses:
JOHN HOWSE,
H. D. MACDONALD.

---

Copies of this patent may be obtained for five cents each, by addressing the "Commissioner of Patents, Washington, D. C."